United States Patent [19]
DeSimone et al.

[11] Patent Number: 5,981,673
[45] Date of Patent: *Nov. 9, 1999

[54] NONAQUEOUS POLYMERIZATION OF FLUOROMONOMERS

[75] Inventors: Joseph M. DeSimone, Chapel Hill; Timothy Romack, Durham, both of N.C.

[73] Assignee: The University of North Carolina at Chapel Hill, Chapel Hill, N.C.

[*] Notice: This patent is subject to a terminal disclaimer.

[21] Appl. No.: 09/039,875

[22] Filed: Mar. 16, 1998

Related U.S. Application Data

[63] Continuation of application No. 08/853,054, May 8, 1997, and a continuation of application No. 08/531,619, Sep. 21, 1995, Pat. No. 5,674,957, and a continuation-in-part of application No. 08/402,202, Mar. 10, 1995, abandoned.

[51] Int. Cl.$^6$ ...................................................... C08F 4/34
[52] U.S. Cl. ..................... 526/89; 526/218.1; 526/231; 526/247; 526/249; 526/254; 526/255; 526/942
[58] Field of Search .................................. 526/89, 218.1, 526/231, 247, 249, 254, 255, 942

[56] References Cited

U.S. PATENT DOCUMENTS

| | | |
|---|---|---|
| 3,085,083 | 4/1963 | Schreyer . |
| 3,522,228 | 7/1970 | Fukui et al. . |
| 3,642,742 | 2/1972 | Carlson . |
| 3,674,758 | 7/1972 | Carlson . |
| 4,743,658 | 5/1988 | Imbalzano et al. . |
| 4,748,220 | 5/1988 | Hartmann et al. . |
| 4,861,845 | 8/1989 | Slocum et al. . |
| 5,021,516 | 6/1991 | Wheland ............................... 525/403 |
| 5,182,342 | 1/1993 | Feiring et al. . |
| 5,275,751 | 1/1994 | Decaire et al. . |
| 5,286,822 | 2/1994 | Krespan et al. . |
| 5,310,836 | 5/1994 | Treat . |
| 5,310,870 | 5/1994 | Peavy . |
| 5,312,882 | 5/1994 | DeSimone et al. ..................... 526/201 |
| 5,328,972 | 7/1994 | Dada et al. . |
| 5,340,490 | 8/1994 | Decaire et al. . |
| 5,345,013 | 9/1994 | Van Bramer et al. . |
| 5,382,623 | 1/1995 | DeSimone et al. ..................... 524/557 |
| 5,451,633 | 9/1995 | DeSimone et al. ..................... 524/731 |
| 5,478,905 | 12/1995 | Anolick et al. ......................... 526/254 |
| 5,506,317 | 4/1996 | DeSimone et al. ..................... 526/201 |
| 5,530,049 | 6/1996 | Dee et al. .............................. 524/424 |

FOREIGN PATENT DOCUMENTS

| | | |
|---|---|---|
| 0 301 532 | 2/1989 | European Pat. Off. . |
| 45-3390 | 2/1970 | Japan . |
| 6-345824 | 12/1994 | Japan . |
| WO 93/20116 | 10/1993 | WIPO . |

OTHER PUBLICATIONS

T. Suwa et al; Melting and Crystallization Behavior of Poly(tetrafluoroethylene). New Method for Molecular Weight Measurement of Poly(tetrafluoroethylene) Using a Differential Scanning Calorimeter; *Journal of Applied Polymer Science* 17, pp. 3253–3257 (1973).

J.M. DeSimone et al; Synthesis of Fluoropolymers in Supercritical Carbon Dioxide, *Science* pp. 1–3 (1992).

A.E. Feiring; Fluoroplastics; *Organofluorine Chemistry; Principles and Commercial Applications* pp. 339–372 (1994).

A.L. Logothetis; Fluoroelastomers; *Organofluorine Chemistry; Principles and Commercial Applications* pp. 373–396 (1994).

A.E. Feiring; Introduction to Fluorinated Polymers; *American Chemical Society* Part 1; pp. 1–59 (1992).

A.T. Worm; Introduction to Fluorocarbon Elastomers; *American Chemical Society* Part 2; pp. 1–40. (1992).

S.V. Gangal; Tetrafluoroethylene–Ethylene Copolymers; *Encyclopedia of Polymer Science and Engineering* 16, pp. 626–642 (1985).

V. Krukonis et al; Supercritical Fluid Chromatography Analysis of Polystyrene, *Polymer Fractionation* pp. 146–147, 156–159, 244–245, 248–249.

J.M. DeSimone et al.; Dispersion Polymerizations in Supercritical Carbon Dioxide, *Science* 265:356–359 (1994).

*Primary Examiner*—Bernard Lipman
*Assistant Examiner*—N. Sarofim
*Attorney, Agent, or Firm*—Myers Bigel Sibley & Sajovec

[57] ABSTRACT

The present invention provides a process for making fluorinated polymers and copolymers having stable end groups. The process includes (1) contacting a fluoromonomer, an initiator capable of producing stable end groups on the polymer chain, and a polymerization medium comprising carbon dioxide, and (2) polymerizing the fluoromonomer. The polymerization medium preferably comprises liquid or supercritical carbon dioxide. Advantageously, the process may also include the step of separating the fluoropolymer from the polymerization medium. The present invention also provides polymerization reaction mixtures useful in the processes of the present invention.

9 Claims, No Drawings

NONAQUEOUS POLYMERIZATION OF FLUOROMONOMERS

RELATED APPLICATIONS

The instant application is a continuation application of U.S. Ser. No. 08/853,054 filed May 8, 1997, which is a continuation of U.S. Ser. No. 08/531,619 filed Sep. 21, 1995 now U.S. Pat. No. 5,674,957, which is continuation-in-part application of U.S. Ser. No. 08/402,202 filed Mar. 10, 1995 now abandoned. The above applications are incorporated herein by reference in their entirety.

FIELD OF THE INVENTION

The present invention relates to a nonaqueous polymerization process for making fluorinated polymers, including copolymers thereof, in a medium comprising carbon dioxide.

BACKGROUND OF THE INVENTION

Two essential techniques have been employed for the polymerization of fluoromonomers. The most inexpensive and commercially employed technique involves the use of a water-soluble polymerization initiator, and is known as an "aqueous polymerization system." The disadvantage of aqueous polymerization systems is that the resulting fluoropolymers have unstable end groups which are undesirable for many applications. Some of these end groups, such as ionic end groups, carboxylic acid end groups and acid fluoride end groups are hydrolytically unstable or decompose under specific processing techniques, resulting in bubbles or discolorations. These undesirable end groups can be avoided through the use of nonaqueous polymerization systems.

One needs to be careful when choosing a non aqueous medium for fluoromonomer polymerization systems so that the medium does not lead to excessive chain transfer reactions. This is because upon treatment of a fluoromonomer, such as tetrafluoroethylene, with a free radical initiator, the result is a propagating radical chain end that is highly electrophilic. Such highly electrophilic fluorinated radicals are prone to extensive chain transfer to conventional solvents. In addition, in nonaqueous polymerization systems, the initiator must be relatively soluble in the nonaqueous medium employed and the initiator must be chosen to give polymers that have stable end groups which do not decompose during processing. One nonaqueous polymerization system involves the use of fluorinated initiators and chlorofluorocarbon polymerization media, such as that described in U.S. Pat. No. 3,642,742 to Carlson. However, in light of the identification of chlorofluorocarbons as one of the primary factors in atmospheric ozone depletion, extensive effort has been directed toward discovering alternative polymerization media systems for fluoropolymerizations.

U.S. Pat. No. 3,642,742 to Carlson discloses one alternative polymerization system involving the use of a fluorinated initiator, a hydrogen containing chain transfer agent, and a fluorocarbon medium. U.S. Pat. No. 5,182,342 to Feiring et al. discloses the use of hydrofluorocarbons as yet another alternative to chlorofluorocarbon systems. Perfluorocarbon and hydrofluorocarbon media are disadvantageous in that they are expensive. Other fluoropolymerization media which have been explored include perfluoroalkyl sulfide fluids, as described in U.S. Pat. No. 5,286,822 to Krespam et al., and perfluorinated cyclic amines, as described in U.S. Pat. No. 5,310,836 to Treat. However, these media are also expensive.

As an alternative polymerization media, researchers have recently begun exploring the use of carbon dioxide as a polymerization medium. For example, U.S. Pat. No. 3,522,228 to Fukui et al. discloses the polymerization of vinyl monomers using peroxide polymerization initiators in liquid carbon dioxide at temperatures from $-78°$ C. to $100°$ C. Fukui provides no example of a fluoromonomer polymerization in a carbon dioxide solvent, and indeed the methods disclosed therein have failed to achieve commercial utility for the preparation of fluoropolymers. In addition, Fukui fails to recognize the important role of stable end groups in fluoropolymers. U.S. Pat. No. 5,328,972 to Dada et al. discloses a process for the production of low molecular weight polymers of $C_3$–$C_4$ monoethyleneically unsaturated monocarboxylic acids in supercritical carbon dioxide at temperatures of at least $200°$ C. and pressures above 3,500 psi. U.S. Pat. No. 5,345,013 to Van Bramer et al. proposes mixtures of tetrafluoroethylene monomer and carbon dioxide for safe handling, but does not discuss fluoropolymerization methods.

PCT Publication No. WO 93/20116 to University of North Carolina at Chapel Hill discloses processes for making fluoropolymers comprising solubilizing a fluoromonomer in a solvent comprising carbon dioxide. PCT Publication No. 93 WO/20116 is not concerned with the problem of polymerizing fluoromonomers to provide polymers having stable end groups.

Accordingly, there remains a need in the art for a method of making fluoropolymers having stable end groups which avoids the use of polymerization media which are detrimental to the environment, such as chlorofluorocarbons. There is also a need in the art for fluoropolymerization processes capable of commercialization, which produce fluoropolymers having stable end groups, and which utilize nonhazardous, relatively inexpensive polymerization media which are relatively easily separable from the fluoropolymer produced.

SUMMARY OF THE INVENTION

As a first aspect, the present invention provides a process for making fluorinated polymers having stable end groups. The process includes (1) contacting a fluoromonomer, an initiator capable of producing stable end groups, and a polymerization medium comprising carbon dioxide, and (2) polymerizing the fluoromonomer. The polymerization medium preferably comprises liquid or supercritical carbon dioxide, and may include other cosolvents as described in detail hereinbelow. The fluoromonomers useful in the methods of the present invention include monomers having at least one fluorine bound to a vinyl carbon and monomers having at least one perfluoroalkyl group bound to a vinyl carbon. The initiators useful in the method of the present invention are typically halogenated free radical initiators, and are soluble in the polymerization medium. Advantageously, the process may also include the step of separating the fluoropolymer from the polymerization medium.

As a second aspect, the present invention provides a process for making a fluorinated copolymer having stable end groups. The process includes (1) contacting a fluoromonomer, one or more comonomers capable of copolymerizing with the fluoromonomer, and an initiator capable of producing stable end groups, in a polymerization medium comprising carbon dioxide, and (2) copolymerizing the fluoromonomer and the comonomer in the polymerization medium.

As a third aspect, the present invention provides a polymerization reaction mixture useful for carrying out the polymerization of a fluoromonomer to produce a fluorinated polymer having stable end groups, said reaction mixture include: (a) a fluoromonomer; (b) an initiator capable of producing stable end groups on said polymer; and (c) a polymerization medium comprising liquid or supercritical carbon dioxide.

As a fourth aspect, the present invention provides a polymerization reaction mixture produced by the polymerization of a fluoromonomer including: (a) a fluorinated polymer having stable end groups; and (b) a polymerization medium comprising liquid or supercritical carbon dioxide.

The foregoing and other aspects of the present invention are explained in detail in the specification set forth below.

DETAILED DESCRIPTION OF THE INVENTION

As used herein, the tern "supercritical" has its conventional meaning in the art. A supercritical fluid (SCF) is a substance above its critical temperature and critical pressure (or "critical point"). Compressing a gas normally causes a phase separation and the appearance of a separate liquid phase. However, if the fluid is in a supercritical state, compression will only result in density increases; no liquid phase will be formed. The use of supercritical fluids for carrying out polymerization processes has received relatively little attention. The term "fluoropolymer," as used herein, has its conventional meaning in the art. See generally *Fluoropolymers* (L. Wall, Ed. 1972) (Wiley-Interscience Division of John Wiley & Sons); See also *Fluorine-Containing Polymers*, 7 Encyclopedia of Polymer Science and Engineering 256 (H. Mark et al. Eds., 2d Ed. 1985). Likewise, the term "fluoromonomer" refers to fluorinated precursor monomers employed in the synthesis of fluoropolymers. The phrase "stable end group(s)" as used herein refers to polymer chain end groups which essentially do not decompose when the polymer is heated to its melt processing temperature. Such processing temperatures are generally known in the art, such as those described in Banks et al. *Organofluorine Chemistry: Principles and Commercial Applications* (1994). Specific examples of stable end groups include but are not limited to perfluoroalkyl end groups, perfluoroalkoxy end groups, perchloroalkyl end groups, and the like. Typically, a polymer having stable end groups is a polymer which has fewer unstable end groups than would be observed in the same polymer, having substantially the same molecular weight, prepared according to aqueous polymerization techniques. More specifically, a polymer having stable end groups is typically a polymer which has less than 400 unstable end groups which can be acid fluoride or carboxylic acid end groups, per million carbon atoms. In particular embodiments, a polymer having stable end groups is a polymer which has 300 or less, 200 or less, or 100 or less, unstable end groups as defined above per million carbon atoms.

The fluoromonomers useful in the processes of the present invention include any suitable fluoromonomers known to those skilled in the art. The fluoromonomers may be in a gaseous or liquid state. Generally, the fluoromonomers useful in the processes of the present invention are homopolymerizable or copolymerizable by a free radical mechanism. Preferred fluoromonomers will contain at least one fluorine atom, perfluoroalkyl group, or perfluoroalkoxy group directly attached to the vinyl group that undergoes polymerization. Examples of suitable fluoromonomers include, but are not limited to, perfluoroolefins, particularly tetrafluoroethylene; perfluoro(alkyl vinyl ethers) with perfluoroalkyl groups containing 1 to 6 carbon atoms and those containing functional groups such as $CF_2=CFOCF_2CF(CF_3)OCF_2CF_2SO_2F$ and $CF_2=CFOCF_2CF(CF_3)OCF_2CF_2CO_2CH_3$; hexafluoropropylene; perfluoro(2,2-dimethyldioxole); fluorodienes, such as $CF_2=CFO(CF_2)_nCF=CF_2$ and $CF_2=CFOCH_2(CF_2)_nCF=CF_2$; and partially fluorinated monomers, particularly vinyl fluoride, vinylidene fluoride, chlorotrifluoroethylene, hexafluoroisobutylene, and perfluoroalkyl ethylenes with perfluoroalkyl groups containing 1 to 6 carbon atoms. Copolymers of fluorinated monomers with nonfluorinated monomers, particularly ethylene, propylene, vinylacetate, alkylvinyl ethers, acrylates, methacrylates, and styrenics may also be included. Copolymers of fluorinated monomers with monomers having a functional group suitable for crosslinking, such as bromotrifluoroethylene and bromodifluoroethylene may also be included. Preferred fluoromonomers include tetrafluoroethylene, hexafluoropropylene, perfluoromethylvinyl ether, perfluoroethylvinyl ether, perfluoropropylvinyl ether, vinyl fluoride, vinylidene fluoride, chlorotrifluoroethylene, and perfluoro (2,2-dimethyl dioxole).

The fluoropolymers produced according to the processes of the present invention include homopolymers of any of the foregoing fluoromonomers, or in the embodiment wherein one or more comonomers are employed in combination with the fluoromonomer, the resulting fluoropolymers may be copolymers. Examples of homopolymers which may be produced according to the methods of the present invention include but are not limited to polytetrafluoroethylene, polyvinylfluoride, polyvinylidine fluoride, polychlorotrifluoroethylene, polyhexafluoroisobutylene, and the like.

The comonomers useful in the methods of the present invention may be fluoromonomers (as indicated above), or they may be non-fluoriniated monomers which are capable of copolymerizing with the fluoromonomers of the present invention. Suitable non-fluorinated comonomers include those described above.

Copolymers which may be produced according to the processes of the present invention include but are not limited to
tetrafluoroethylene/hexafluoropropylene,
tetrafluoroethylene/hexafluoropropylene/vinylidine fluoride,
hexafluoropropylene/vinylidine fluoride,
perfluoro(methyl vinyl ether)/vinylidine fluoride,
perfluoro(methyl vinyl ether)/vinylidinefluoride/
  tetrafluoroethylene,
chlorotrifluoroethylene/vinylidine fluoride,
chlorotrifluoroethylene/ethylene,
chlorotrifluoroethylene/tetrafluoroethylene/ethylene,
tetrafluoroethylene/perfluoro(propyl vinyl ether),
tetrafluoroethylene/perfluoro(methyl vinyl ether),
tetrafluoroethylene/perfluoro(2,2-dimethyl-1,3-dioxole),
tetrafluoroethylene/ethylene,
tetrafluoroethylene/propylene,
tetrafluoroethylene/$CF_2=CFOCF_2CF(CF_3)OCF_2CF_2SO_2F$,
tetrafluoroethylene/$CF_2=CFOCF_2CF_2SO_2F$,
tetrafluoroethylene/hexafluoropropylene/perfluoro(propyl
  vinyl ether), and
tetrafluoroethylene/$CF_2=CFO(CF_2)_nCF=CF_2$.

Preferred copolymers which may be produced according to processes of the present invention include perfluorinated copolymers such as
tetrafluoroethylene/perfluoro(propyl vinyl ether), tetrafluoroethylene/hexafluoropropylene, tetrafluoroethylene/perfluoro(2,2-dimethyl-1,3-dioxide), tetrafluoroethylene/perfluoro(methyl vinyl ether), tetrafluoroethylene/$CF_2$=$CFOCF_2CF_2SO_2F$, and tetrafluoroethylene/$CF_2$=$CFOCF_2(CF_3)OCF_2CF_2SO_2F$.

In the processes of the present invention, the fluoromonomers are polymerized in the presence of a polymerization initiator. The initiator is capable of providing a stable end group on the polymer chain. Generally, the initiator becomes part of the polymer chain. Consequently, upon the termination of polymerization, the initiator provides the end group for the polymer chain. Examples of suitable initiators which are capable of providing a stable end group include but are not limited to halogenated initiators. Suitable halogenated initiators include, for example, chlorinated and fluorinated initiators, which are capable of decomposing into free radical species. Initiators which are soluble in the polymerization medium are preferred. For example, suitable polymerization initiators include chlorocarbon based and fluorocarbon based acyl peroxides such as trichlioroacetyl peroxide, bis(perfluoro-2-propoxy propionyl) peroxide, [$CF_3CF_2CF_2OCF(CF_3)COO$]$_2$, perfluoropropionyl peroxides, ($CF_3CF_2CF_2COO$)$_2$, ($CF_3CF_2COO$)$_2$, {($CF_3CF_2CF_2$)[$CF(CF_3)CF_2O$]$_n CF(CF_3)COO$}$_2$, [$ClCF_2(CF_2)_n COO$]$_2$, and [$HCF_2(CF_2)_n COO$]$_2$ where n=0–8; perfluoroalkyl azo compounds such as perfluoroazoisopropane, [($CF_3$)$_2$CFN=]$_2$; $R_4$N=$NR_4$, where $R_4$ is a linear or branched perfluorocarbon group having 1–8 carbons; stable or hindered perfluoroalkane radicals such as hexafluoropropylene trimer radical, [($CF_3$)$_2$CF]$_2$($CF_2CF_2$)C. radical and perfluoroalkanes. Preferably, the initiator is a fluorinated initiator, and more preferably the initiator is selected from the group consisting of bis(perfluoro-2-propoxy propionyl) peroxide, perfluoropropionyl peroxide, perfluoroazoisopropane, and hexafluoropropylene trimer radical.

The stable end group which is provided by the polymerization initiator is a function of the particular initiator employed. Typically, the stable end group is a perfluoroalkyl, perfluoroalkoxy, or perchloroalkyl end group inasmuch as the initiators typically contain such groups. These end groups are thermally and hydrolytically stable during conventional fluoropolymer processing conditions, and do not decompose to other species.

The processes of the invention are carried out in a polymerization medium comprising carbon dioxide. The carbon dioxide is typically in a liquid or supercritical state. Preferably the polymerization medium is supercritical carbon dioxide. In a supercritical polymerization medium, only a single fluid phase is present; as a result, the effective concentration of a gaseous monomer, such as tetrafluoroethylene, is directly a function of the amount charged and is not dependent upon the solubility of the gaseous monomer in a liquid polymerization medium. This presents an advantage in terms of copolymer composition control. In addition, supercritical carbon dioxide is a highly tunable polymerization medium and allows the manipulation of solvent strength and density through simple changes in temperature and pressure, which in turn allows an additional measure of control over reaction parameters. Supercritical carbon dioxide also offers high mass transport rates and low fluid viscosity.

The polymerization medium may also include one or more cosolvents. Illustrative cosolvents include but are not limited to, perfluorocarbons, hydrofluorocarbons, perfluoroalkyl sulfides, and like. It may be desirable for the cosolvent to be capable of solubilizing the initiator such that the initiator may be provided to the reaction in the solubilized form.

The initiator may be added in neat form, as a solution in carbon dioxide, or it may conveniently be added as a solution in a cosolvent. Typically, the initiator is used in an amount conventionally employed for polymerization.

The amount of initiator employed depends on several factors, including the specific monomers and comonomers to be polymerized, the reactivity of the monomers or comonomers, the reaction conditions, and the particular initiator chosen. For example, the initiator may be used in an amount of about $10^{-6}$ to 10, preferably about $10^{-5}$ to 2, parts by weight per 100 parts by weight monomer.

The polymerization reaction mixture may include other additives and reactants known to those skilled in the art for controlling the physical or chemical properties of the resulting polymer. For example, in one preferred embodiment, the polymerization reaction mixture includes a chain transfer agent for regulating the molecular weight of the resulting polymer. Suitable chain transfer agents will be readily known to those skilled in the art and include, for example, hydrocarbons such as ethane and methyl cyclohexane; alcohols, such as methanol; mercaptans, such as ethyl and butyl mercaptan; sulfides, such as butyl sulfide; and halogenated hydrocarbons such as alkyl iodides, perfluoroalkyl iodides, alkyl bromides, perfluoroalkyl bromides, carbon tetrachloride, and chloroform. As will be appreciated by those skilled in the art, when chain transfer agents are employed a significant number of end groups are derived from tile chain transfer agent. As a result chain transfer agents should be selected so as to avoid the formation of unstable end groups. Preferred chain transfer agents include ethane and chloroform.

It may be desirable to also include compounds which accelerate the decomposition of the initiator. Such compounds typically permit the polymerization reaction to take place a lower pressures than would otherwise be required, thus permitting the methods of the present invention to be practiced in conventional fluoropolymerization reactors. Suitable compounds which accelerate decomposition are known to those skilled in the art and include but are not limited to, redox systems, sulfur dioxide, ultraviolet light, and others.

The polymerization reaction may be carried out at a temperature of about −50° C. up to about 200° C., and is typically carried out at a temperature of between about −20° C. and about 150° C. The reaction may be carried out at a pressure ranging from about 15 psi to about 45,000 psi, and is typically carried out at a pressure of between about 500 psi and about 10,000 psi.

The polymerization can be carried out batchwise or continuously with thorough mixing of the reactants in any appropriately designed high pressure reaction vessel. To remove the heat evolved during the polymerization, advantageously the pressure apparatus includes a cooling system. Additional features of the pressure apparatus used in accordance with the invention include heating means such as an electric heating furnace to heat the reaction mixture to the desired temperature and mixing means, i.e., stirrers such as paddle stirrers, impeller stirrers, or multistage impulse countercurrent agitators, blades, and the like.

The polymerization can be carried out, for example, by feeding a mixture of monomer and carbon dioxide into a pressure apparatus containing the initiator. The reaction vessel is closed and the reaction mixture brought to the polymerization temperature and pressure. Alternatively, only a part of the reaction mixture may be introduced into an autoclave and heated to the polymerization temperature and pressure, with additional reaction mixture being pumped in at a rate corresponding to the rate of polymerization. In another possible procedure, some of the monomers are initially taken into the autoclave in the total amount of carbon dioxide and the monomers or comonomers are pumped into the autoclave together with the initiator at the rate at which the polymerization proceeds. Continuous or semibatch modes of addition may be useful to control polymer composition and composition distribution. These modes are particularly useful in copolymerization of two monomers with dramatically different reactivities such as tetrafluoroethylene and hexafluoropropylene.

When the polymerization is complete the polymer may be separated from the reaction mixture. Any suitable means of separating the polymer from the reaction mixture may be employed. Typically, according to the process of the present invention, the polymer is separated from the reaction mixture by venting the polymerization medium to the atmosphere. Thereafter the polymer may be collected by physical isolation.

It may be desirable, for some applications to wash the resulting polymer prior to further processing. The polymer is preferably washed in a wash fluid comprising carbon dioxide prior to or after venting the polymerization medium to the atmosphere and collecting the polymer. Typically, the wash fluid comprises carbon dioxide, or a mixture of carbon dioxide with methanol, amines such as ammonia, or fluorine gas. The methanol, amines, or fluorine gas may be introduced into the reactor containing the polymerization medium by suitable means known to those skilled in the art.

The fluoropolymers produced according to the processes of the present invention contain stable end groups. Preferably, the fluoropolymers contain perfluoroalkyl, perfluoroalkoxy, or perchloroalkyl end groups. These fluoropolymers are useful in areas where conventional fluoropolymers are employed, and particularly as wire coatings, gaskets, seals, hoses, vessel linings, elastomer, molded resins, protective coatings, and the like.

The following examples are provided to illustrate the present invention, and should not be construed as limiting thereof. In these examples, "psi" means pounds per square inch; "g" means grams; "mg" means milligrams; "mL" means milliliters; "min." means minutes; "FTIR" means fourier transform infrared; "IR" means infrared; and "° C." means degrees celsius. Molecular weight is estimated using the method described in T. Suwa, et al., *J. Applied Polymer Sci.* 17:3253 (1973).

EXAMPLE 1

Tetrafluoroethylene Homopolymer

A 25 ml high pressure reactor is cooled to well below 0° C. in a dry ice/acetone bath under argon. A 0.018 M solution of HFPO dimer peroxide initiation of 1,1,2-trichlorotrifluoroetlhane (0.050 ml) is added while maintaining a positive argon purge, and the reactor is sealed. A 50/50 wt./wt. % mixture (9.7 g) of tetrafluoroethylene (4.8 g) and carbon dioxide (4.8 g) is condensed into the reactor at a temperature of below −20° C., and $CO_2$ (10 g) is added via high pressure syringe pump. The reactor is slowly heated to 35° C. and held for 3 hours. After the reaction is complete the carbon dioxide and excess monomer are vented slowly to the atmosphere, the reactor is opened, and the product collected. The product is washed twice with 1,1,2-trichlorotrifluoroethane/methanol (1:1) and dried under vacuum at elevated temperature. The reaction yields 1.57 g of a white polymer (32% yield). Thermogravimetric shows a 5% weight loss at 533.2° C. Differential scanning calorimetry shows a virgin melting point of 328.5° C., a second melt of 328.5° C., and a crystallization exotherm at 308.7° C. (second cooling) yielding a heat of crystallization of 50.6 J/g corresponding to an estimated molecular weight of 55,000 g/mol.

EXAMPLE 2

Tetrafluoroethylene Homopolymer

A 25 ml high pressure reactor is cooled to well below 0° C. in a dry ice/acetone bath under argon. A 0.24 M solution of HFPO dimer peroxide initiator in 1,1,2-trichlorotrifluoroethane (0.010 ml) is added while maintaining a positive argon purge, and the reactor is sealed. A 50/50 wt./wt. % mixture (12.9 g) of tetrafluoroethylene (6.4 g) and carbon dioxide (6.4 g) is condensed into the reactor at a temperature of below −20° C., and 10 g $CO_2$ (10 g) is added via high pressure syringe pump. The reactor is slowly heated to 35° C. and held for 4 hours. After the reaction is complete the carbon dioxide and excess monomer are vented slowly to the atmosphere, the reactor is opened, and the product is collected. The product is washed twice. After washing twice with a 50/50 mixture of 1,1,2-trichlorotrifluoroethane/methanol, the product is dried under vacuum at elevated temperature. The reaction yields 6.47 grams of white polymer (100% yield). Thermogravimetric analysis shows a 5% weight loss at 537.2° C. Differential scanning calorimetry shows a virgin melting point of 334.9° C., a second melt of 328.5° C., a crystallization exotherm at 309.2° C. (second cooling), yielding a heat of crystallization of 41.2 J/g corresponding to an estimated molecular weight of 160,000 g/mol.

EXAMPLE 3

PPVE/TFE Copolymer

A 25 ml high pressure reactor is cooled to well below 0° C. in a dry ice/acetone bath under argon. A 0.018 M solution of HFPO dimer peroxide initiator in 1,1,2-trichlorotrifluoroetlhane (0.10 ml) perfluoro(propyl vinyl ether) (0.80 ml, 1.2 g), which has been sparged with argon are added while maintaining a positive argon purge, and the reactor is sealed. A 50/50 wt./wt. % mixture (10.5 g) of tetrafluoroethylene (5.2 g) and carbon dioxide (5.2 g) is condensed into the reactor at a temperature of below −20° C., and $CO_2$ (10 g) were added via high pressure syringe pump. The reactor is slowly heated to 35.0° C., and held for 4 hours. The reactor window gradually becomes cloudy over the first thirty minutes after which time the window appears white and no further change can be observed. After the reaction is complete the carbon dioxide and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 5.32 g of white polymer (100% yield based on TFE). Thermogravimetric analysis shows a 5% weight loss at 535.0° C. Differential scanning calorimetry shows a virgin melting point of 330.5° C., a second melt of 328.5° C., and a crystallization exotherm at 303.3° C. (second cooling). End group analysis by FTIR found no detectable acid fluoride or carboxylic acid end groups.

For copolymers incorporating fluorinated vinyl ether monomers, such as perfluoro(propyl vinyl ether), unstable acid fluoride end groups may be observed when polymerization is carried out in conventional polymerization media such as 1,1,2-trichlorotrifluoroethane, even though the initiators employed are capable of providing stable end groups. The unstable acid fluoride end groups are believed to result from chain transfer/rearrangement side reactions involving the fluorinated alkyl vinyl ether. U.S. Pat. No. 4,743,658 to Imbalzano et al., the disclosure of which is hereby incorporated by reference in its entirety, discusses copolymers of perfluoro(propyl vinyl ether) and tetrafluoroethylene prepared using a perfluorinated acid peroxide in a 1,1,2-trichlorotrifluoroethane polymerization medium. The resulting Imbalzano et al. copolymer exhibits 138 acid fluoride end groups per million carbon atoms. In contrast, the combined acid fluoride and carboxylic acid end groups for copolymerizations conducted in accordance with the present invention in carbon dioxide were not greater than 11 unstable groups per million carbon atoms. This result indicates that the initiators employed in the present invention in combination with the carbon dioxide polymerization medium advantageously reduce the number of unstable end groups to a significant degree. It is believed that the carbon dioxide polymerization medium of the present invention limits the fluoroalkyl vinyl ether rearrangement, thus producing fewer unstable end groups. For the reaction run in carbon dioxide and methanol, as a chain transfer agent, 80 methyl ester end groups were observed per million carbon atoms.

EXAMPLE 4

PPVE/TFE Copolymer

A 25 ml high pressure reactor is cooled to well below 0° C. in a dry ice/acetone bath under argon. A 0.018 M solution of HFPO dimer peroxide initiator in 1,1,2-trichlorotrifluoroethane (0.10 m) and perfluoro(propyl vinyl ether) (0.80 ml, 1.2 g) which has been sparged with argon are added while maintaining a positive argon purge, and the reactor is sealed. A 50/50 wt./wt. % mixture (9.4 g) of tetrafluoroethylene (4.7 g) and carbon dioxide (4.7 g) is condensed into the reactor at a temperature of below −20° C., and $CO_2$ (10 g) is added via high pressure syringe pump. The reactor is slowly heated to 35.0° C. and held for 3 hours at which time heating is discontinued. After the reaction is complete the carbon dioxide and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 4.67 g of white polymer (99% yield based on TFE). Thermogravimetric analysis shows a 5% weight loss at 524.2° C. Differential scanning calorimetry shows a virgin melting point of 321.5° C., and a crystallization exotherm at 291.3° C. (first cooling). End group analysis by FTIR found no detectable acid fluoride or carboxylic acid end groups.

EXAMPLE 5

TFE/PPVE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.10 ml) and 2.4 ml (3.7) perfluoro(propyl vinyl ether) (2.4 ml, 3.7 g) which has been sparged with argon, are added while maintaining a positive argon purge, and the reactor is sealed. A 50/50 wt./wt. % mixture (11.0 g) of tetrafluoroethylene (5.5 g) and carbon dioxide (5.5 g) is condensed into the reactor at a temperature of below −20° C., and $CO_2$ (10 g) is added via high pressure syringe pump. The reactor is slowly heated to 35° C. and held for 4 hours at which time heating is discontinued. After the reaction is complete the carbon dioxide and excess monomer are vented slowly to the atmosphere, the reactor is opened and the product collected. The product is washed twice with a 50/50 mixture of 1,1,2-trichlorotrifluoroetlhane/methanol and dried under vacuum at elevated temperature. The reaction yields 5.58 g of white polymer (100% yield based on TFE). Thermogravimetric analysis shows a 5% weight loss at 494.0° C. Differential scanning calorimetry shows a virgin melting point of 318.6° C. and a crystallization exotherm at 300.9° C. (first cooling). End group analysis by FTIR found a combined total of three acid fluoride and carboxylic acid end groups per $10^6$ carbon atoms.

EXAMPLE 6

TFE/PPVE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.080 ml) and perfluoro(propyl vinyl ether) (2.4 ml, 3.7 g) which has been sparged with argon, is added while maintaining a positive argon purge, and the reactor is sealed. A 50/50 wt./wt. % mixture (10.1 g) of tetrafluoroethylene (5.0 g) and carbon dioxide (5.0 g) is condensed into the reactor at a temperature of below −20° C. and $CO_2$ (10 g) is added via high pressure syringe pump. The reactor is then slowly heated and at ca. 22° C. an exothermic reaction brings the temperature to 50.9° C. After several minutes the temperature decreases to 35 and is maintained for 4 hours at which time heating is discontinued. The cell window gradually becomes cloudy over the first few minutes after which time the window appears white and no further change can be observed. After the reaction is complete the carbon dioxide and excess monomer are vented slowly to the atmosphere, the reactor is opened, and the product collected. The product is washed twice with a 50/50 mixture of 1,1,2-trichlorotrifluoroethane/methanol and dried under vacuum at elevated temperature. The reaction yields 5.03 g of white polymer (100% yield based on TFE). Thermogravimetric analysis shows a 5% weight loss at 511.1° C. Differential scanning calorimetry shows a virgin melting point of 312.7° C., and a crystallization exotherm at 294.0° C. (first cooling). Analysis by FTIR observed 5.20 wt. % perfluoro(propylvinyl ether) incorporation and only 1.7 carboxylic acid and 2.5 carboxylic acid fluoride end groups per $10^6$ carbon atoms.

EXAMPLE 7

TFE/PPVE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroetlhane (0.08 ml) and perfluoro(propyl vinyl ether) (4.0 ml, 6.1 g) which has been sparged with argon, are added while maintaining a positive argon purge, and the reactor is sealed. A 50/50 wt./wt. % mixture (11.2 g) of tetrafluoroethylene (5.6 g) and carbon dioxide (5.6 g) is condensed into the reactor at a temperature of below −20° C. and $CO_2$ (10 g) is added via high pressure syringe pump. The reactor is slowly heated and at ca. 25.0° C. an exothermic reaction brings the temperature to 52.0° C. After several minutes, the temperature decreases to 35° C. where it is maintained for 4 hours, at which time heating is discontinued. After the reaction is complete the carbon dioxide and excess monomer are vented slowly to the atmosphere, the reactor is opened, and the product collected. The product is washed twice with a 50/50 mixture of 1,1,2-trichlorotrifluoroethane/methanol and dried under vacuum at elevated temperature. The reaction yields 5.67 g of white polymer (100% yield based on TFE). Thermogravimetric analysis shows a 5% weight loss at 511.4° C. Differential scanning calorimetry shows a virgin melting point of 313.7° C., and a crystallization exotherm at 295.0° C. (first cooling). Analysis by FTIR observed 5.77 wt. % perfluoro (propylvinyl ether) incorporation and only 2.7 carboxylic acid and less than 3 carboxylic acid fluoride end groups per $10^6$ carbon atoms.

EXAMPLE 8

TFE/PPVE Copolymer

A 25 ml high pressure reactor is chilled to well below 0° C. in a dry ice bath under argon. A 0.24 M solution of bis(perfluoro-2-propoxypropionyl)peroxide in F-113 (0.05 ml) and perfluoro(propyl vinyl ether) (5.0 ml, 7.6 g) which had previously been sparged with argon, are added while maintaining a positive argon purge and the reactor is sealed. A 50 wt./wt. % mixture (9.8 g) of tetrafluoroethylene (4.9 g) and carbon dioxide (4.9 g) is condensed into the reactor at a temperature of below −20° C., and $CO_2$ (10 g) is added via high pressure syringe pump. The reactor is slowly heated to 35° C. and held for 3.5 hours at which time heating is discontinued. After the reaction is complete the carbon dioxide and excess monomer are vented slowly to the atmosphere, the reactor is opened, and the product collected. The product is washed twice with a 50/50 mixture of 1,1,2-trichlorotrifluoroethane and dried under vacuum at elevated temperature. The reaction yields 5.05 g of product (100% yield based on TFE). Thermogravimetric shows a 5% weight loss at 512.1° C. Differential scanning calorimetry shows a virgin melting point of 317.6° C., and a crystallization exotherm at 298.9° C. (first cooling).

EXAMPLE 9

TFE/HFP Copolymer

A 25 ml high pressure reactor is chilled to well below 0° C. in a dry ice/acetone bath under argon. A 0.024 M solution of HFPO dimer peroxide initiator in 1,1,2-trichlorotrifluoroetlhane (0.050 ml) is added while maintaining a positive argon purge, and the reactor is sealed. Hexafluoropropylene (19.3 g) and a 50/50 wt./wt. % mixture (3.4 g) of tetrafluoroethylene (1.7 g) and carbon dioxide (1.7 g) are condensed into the cell at a temperature of below −20° C. The reactor is slowly heated to 35.0° C. and held for 8 hours. After the reaction time is complete the carbon dioxide and excess monomer are vented slowly to the atmosphere, the reactor is opened, and the product collected. The product is washed twice with a 50/50 mixture of 1,1,2-trichlorotrifluoroethane and dried under vacuum at elevated temperature. The reaction yields 0.052 g of white polymer (3.1% yield). Thermogravimetric analysis shows a 5% weight loss at 410.0° C. Differential scanning calorimetry shows a virgin melting point of 249.7° C., and a crystallization exotherm at 242.8° C. (first cooling).

EXAMPLE 10

TFE/HFP Copolymer

A 25 ml high pressure reactor is chilled to well below 0° C. in a dry ice/acetone bath under argon. A 0.18 M solution of HFPO dimer peroxide initiator in 1,1,2-trichlorotrifluoroetlhane (0.050 ml) is added while maintaining a positive argon purge, and the reactor is sealed. Hexafluoropropylene (14.7 g) and a 50/50 wt./wt. % mixture (2.6 g) of tetrafluoroethylene (1.3 g) and carbon dioxide (1.3 g) are condensed into the reactor at a temperature of below −20° C. and $CO_2$ (5.2 g) is added via high pressure syringe pump. The reactor is then slowly heated to 35.0° C. and held for 3 hours. After the reaction is complete, the carbon dioxide and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 0.34 g of white polymer (26% yield). Thermogravimetric analysis shows a 5% weight loss at 494.0° C. Differential scanning calorimetry shows a virgin melting point of 267.1° C., and a crystallization exotherm at 247.9° C. (first cooling).

EXAMPLE 11

TFE/HFP Copolymer

A 25 ml high pressure reactor is chilled to well below 0° C. in a dry ice/acetone bath under argon. A 0.24 M solution of HFPO dimer peroxide initiator in 1,1,2-trichlorotrifluoroetlhane (0.20 ml) is added while maintaining a positive argon purge, and the reactor is sealed. Hexafluoropropylene (19.2 g) and a 50/50 wt./wt. % mixture (4.4 g) of tetrafluoroethylene (2.2 g) and carbon dioxide (2.2 g) are condensed into the reactor at a temperature of below −20° C. and $CO_2$ (5.1 g) is added via high pressure syringe pump. The reactor is slowly heated to 35.0° C. and held for 4 hours. After the reaction is complete, the carbon dioxide and excess monomer are vented slowly to the atmosphere, the cell is opened and the product collected. The product is washed twice with a 50/50 mixture of 1,1,2-trichlorotrifluoroethane/methanol and dried under vacuum at elevated temperature. The reaction yields 1.8 grams of white polymer (72% yield). Thermogravimetric analysis shows a 5% weight loss at 447.0° C. Differential scanning calorimetry shows a virgin melting point of 265.8° C., and a crystallization exotherm at 248.7° C. (first cooling).

EXAMPLE 12

TFE/HFP

A 25 ml high pressure reactor is chilled to well below 0° C. in a dry ice/acetone bath under argon. A 0.24 M solution of HFPO dimer peroxide initiator in 1,1,2-trichlorotrifluoroethane (0.03 ml) is added while maintaining a positive argon purge, and the reactor is sealed. Hexafluoropropylene (19.3 g) and a 50/50 wt./wt. % mixture (4.8 g) of tetrafluoroethylene (2.4 g) and carbon dioxide (2.4 g) are condensed into the reactor at a temperature of below −20° C. and $CO_2$ (5.1 g) is added via high pressure syringe pump. The reactor is slowly heated to 35.0° C. and held for 4 hours. After the reaction is complete, the carbon dioxide and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 1.7 g of white polymer (71% yield). Thermogravimetric analysis shows a 5% weight loss at 477.0° C. Differential scanning calorimetry shows a virgin melting point of 254.8° C., and a crystallization exotherm at 255.3° C. (first cooling). Analysis by FTIR observed 4.3 wt. % hexafluoropropylene incorporation.

EXAMPLE 13

TFE/PMVE Copolymer

A 25 ml high pressure reactor is chilled to well below 0° C. in a dry ice/acetone bath under argon. A 0.018 M solution of HFPO dimer peroxide initiator in 1,1,2-trichlorotrifluoroetlhane (0.20 ml) is added while maintaining a positive argon purge, and the reactor is sealed. Perfluoro(methyl vinyl ether) (1.4 g) and a 50/50 wt./wt. % mixture (13.1 g) of tetrafluoroethylene (6.6 g) and carbon dioxide (6.6 g) are condensed into the reactor at a temperature of below −20° C. and $CO_2$ (10 g) is added via high pressure syringe pump. The reactor is slowly heated to 35.0° C. and held for 3 hours. After the reaction is complete, the carbon dioxide and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 1.5 grams of white polymer (19% yield). Thermogravimetric analysis shows a 5% weight loss at 534.7° C. Differential scanning calorimetry shows a virgin melting point at 311.4° C., crystallization exotherm at 278.2° C. (first cooling), and a second order transition at −39° C.

EXAMPLE 14

TFE/PMVE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.20 ml) is added while maintaining a positive argon purge, and the reactor is sealed. Perfluoro(methyl vinyl ether) (6.1 g) and a 50/50 wt./wt. % mixture (5.6 g) of tetrafluoroethylene (2.8 g) and carbon dioxide (2.8 g) are condensed into the cell at a temperature of below −20° C. and $CO_2$(8 g) is added via high pressure syringe pump. The reactor is slowly heated to 35.0° C. and held for 3 hours. After the reaction is complete the $CO_2$ and excess monomer are vented slowly to the atmosphere, the reactor opened, and the product collected. The product is washed twice with a 50/50 mixture of 1,1,2-trichlorotrifluoroethane/methanol and dried under vacuum at elevated temperature. The reaction yields 2.2 g of white polymer (25% yield). Thermogravimetric analysis shows a 5% weight loss at 491.3° C. Differential scanning calorimetry shows the absence of a crystalline melting point.

EXAMPLE 15

PMVE/TFE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.20 ml) is added while maintaining a positive argon purge, and the reactor is sealed. Perfluoro(methyl (3.5 g) vinyl ether) (2.5 g) and a 50/50 wt./wt. % mixture (7.0 g) of tetrafluoroethylene (3.5 g) and $CO_2$ (3.5 g) are condensed into the reactor at a temperature of below −20° C. and $CO_2$ (11.5) is added via high pressure syringe pump. The reactor is slowly heated to 35.0° C. and held for 3 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 4.9 g of white polymer (80% yield). Thermogravimetric analysis shows a 5% weight loss at 500.7° C. Differential scanning calorimetry shows the absence of a crystalline melting point.

EXAMPLE 16

VF2/HFP Copolymer

A 25 ml high pressure reactor is chilled to well below 0° C. in a dry ice/acetone bath under argon. A 0.018 M solution of HFPO dimer peroxide initiator in 1,1,2-trichlorotrifluoroetlhane (0.20 ml) is added while maintaining a positive argon purge, and the reactor is sealed. Hexafluoropropylene (15.1 g) and vinylidine fluoride (4.0 g) are condensed into the reactor at a temperature of below −20° C. and $CO_2$ (5 g) is added via high pressure syringe pump. The reactor is slowly heated to 35.0° C. and held for 3 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under a vacuum at elevated temperature. The reaction yields 0.27 g of gummy translucent polymer (7% yield based on vinylidine fluoride). Thermogravimetric analysis shows a 5% weight loss at 456.9° C. Differential scanning calorimetry shows a glass transition at −19.5° C.

EXAMPLE 17

VF2/CTFE Copolymer

A 25 ml high pressure reactor is chilled to well below 0° C. in a dry ice/acetone bath under argon. A 0.18 M solution of HFPO dimer peroxide initiator in 1,1,2-trichlorotrifluoroethane (0.020 ml) is added while maintaining a positive argon purge, and the reactor is sealed. Chlorotrifluoroethylene (2.0 g) and vinylidine fluoride (4.5 g) are condensed into the reactor at a temperature of below −20° C. and $CO_2$ (10 g) is added via high pressure syringe pump. The reactor is slowly heated to 35.0° C. and held for 3 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 0.52 g of gummy translucent polymer (8% yield). Thermogravimetric analysis shows a 5% weight loss at 433.8° C. Differential scanning calorimetry shows glass transition at −8.3° C.

EXAMPLE 18

VF2/CTFE Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.20 ml) is added while maintaining a positive argon purge, and the reactor is sealed. Chlorotrifluoroethylene (3.3 g) and vinylidine fluoride (3.3 g) are condensed into the reactor at a temperature of below −20° C. and $CO_2$ (15 g) is added via high pressure syringe pump. The reactor is then slowly heated to 35.0° C. and held for 4 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reac-

EXAMPLE 19

Vinyl Fluoride Homopolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.015 ml) is added while maintaining a positive argon purge, and the reactor is sealed. Vinyl fluoride (3.8 g) is condensed into the reactor at a temperature of below −20° C. and $CO_2$ (15 g) is added via high pressure syringe pump. The reactor is slowly heated to 35.0° C. and held for 4 hours. After the reaction is complete the $CO_2$ and excess monomer are vented slowly to the atmosphere, the cell is opened and the product collected. The product is washed twice with a 50/50 mixture of 1,1,2-trichlorotrifluoroethane/methanol and dried under vacuum at elevated temperature. The reaction yields 0.45 g of gummy translucent polymer (12% yield). Thermogravimetric analysis shows a 5% weight loss at 407.7° C. Analysis by differential scanning calorimetry showed a virgin melting point of 208.4° C. and a crystallization exotherm at 164.7° C. (first cooling).

EXAMPLE 20

TFE/Ethylene Copolymer

A 25 ml high pressure reactor is chilled to well below 0° C. in a dry ice/acetone bath under argon. A 0.24 M solution of HFPO dimer peroxide initiator in 1,1,2-trichlorotrifluoroethane (0.015 ml) is added while maintaining a positive argon purge, and the reactor is sealed. A 50/50 wt./wt. % mixture (8.9 g) of tetrafluoroethylene (4.4 g) and $CO_2$ (4.4 g) and ethylene (3.4 g) are added to the reactor at a temperature of below −20° C. and $CO_2$ (10 g) is added via high pressure syringe pump. The reactor is slowly heated to 35.0° C. and held for 4 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 4.8 grams of white polymer (62% yield). Thermogravimetric analysis shows a 5% weight loss at 458.2° C. Differential scanning calorimetry shows a virgin melting point of 231.9° C. and crystallization exotherms at 208.4 and 214.5° C.

EXAMPLE 21

TFE/Ethylene Copolymer

A 25 ml high pressure reactor is chilled to well below 0° C. in a dry ice/acetone bath under argon. A 0.24 M solution of HFPO dimer peroxide initiator in 1,1,2-trichlorotrifluoroetlhane (0.015 ml) is added while maintaining a positive argon purge, and the reactor is sealed. A 50/50 wt./wt. % mixture (9.3 g) of tetrafluoroethylene (4.6 g) and $CO_2$ (4.6 g) and ethylene (1.9 g) is added to the reactor at a temperature of below −20° C. and $CO_2$ (10 g) is added via high pressure syringe pump. The reactor is slowly heated to 35.0° C. and held for 4 hours. After the reaction is complete the $CO_2$ and excess monomer are vented slowly to the atmosphere, the reactor is opened and the product collected. The product is washed twice with a 50/50 mixture of 1,1,2-trichlorotrifluoroethane/methanol and dried under vacuum at elevated temperature. The reaction yields 2.9 of white polymer (45% yield). Thermogravimetric analysis shows a 5% weight loss at 469.4° C. Differential scanning calorimetry shows virgin melting point of 273.1° C. and a crystallization exotherm at 248.0° C.

EXAMPLE 22

TFE/PPVE Copolymer

A 500 ml high pressure AUTOCLAVE™ fitted with a MAGNADRIVE™ stirrer is cooled to well below 0° C. in a dry ice bath under argon. A 0.24 M solution of bis (perfluoro-2-propoxypropionyl)peroxide in 1,1,2-trichlorotrifluoroethane (0.70 ml), methanol (0.10 ml—as a chain transfer agent), and perfluoro(propyl vinyl ether) (30 ml, 46 g) which had previously been sparged with argon, are added while maintaining a positive argon purge and the reactor is sealed. A 50 wt./wt. % mixture (123 g) of tetrafluoroethylene (61.5 g) and carbon dioxide (61.5 g) is condensed into the reactor at a temperature of below −20° C., and $CO_2$ (190 g) is added via high pressure syringe pump. The reactor is heated to 35° C. and held for 4 hours at which time heating is discontinued. After the reaction is complete the carbon dioxide and excess monomer are vented to the atmosphere, the reactor is opened, and the product collected. The product is washed twice with a 50/50 mixture of 1,1,2-trichlorotrifluoroethane/methanol and dried under vacuum at elevated temperature. The reaction yields 43 g of product (70% yield based on TFE). Thermogravimetric shows a 5% weight loss at 511.5° C. Differential scanning calorimetry shows a virgin melting point of 297.1° C., and a crystallization exotherm at 276.3° C. (first cooling). End group analysis by FTIR found a combined total of 11 acid fluoride and carboxylic acid end groups per million carbon atoms, in addition to 80 methyl ester end groups per million carbon atoms.

EXAMPLE 23

TFE/HFP Copolymer

A 500 ml high pressure AUTOCLAVE™ fitted with a MAGNADRIVE™ stirrer is cooled to well below 0° C. in a dry ice bath under argon. A 0.24 M solution of bis (perfluoro-2-propoxypropionyl)peroxide in 1,1,2-trichlorotrifluoroethane (3.0 ml), is added while maintaining a positive argon purge and the reactor is sealed. Hexafluoropropylene (257 g) and a 50/50 wt./wt. % mixture (56 g) of tetrafluoroethylene (28 g) and carbon dioxide (28 g) is condensed into the reactor at a temperature of below −20° C., and $CO_2$ (100 g) is added via high pressure syringe pump. The reactor is heated to 35° C. and held for 4 hours at which time heating is discontinued. After the reaction is complete the carbon dioxide and excess monomer are vented to the atmosphere, the reactor is opened, and the product collected. The product is washed twice with a 50/50 mixture of 1,1,2-trichlorotrifluoroethane/methanol and dried under vacuum at elevated temperature. The reaction yields 17.7 g of product (63% yield based on TFE). Thermogravimetric shows a 5% weight loss at 471.2° C. Differential scanning calorimetry shows a virgin melting point of 260.6° C., and a crystallization exotherm at 251.5° C. (first cooling).

The foregoing is illustrative of the present invention and is not to be construed as limiting thereof. The invention is defined by the following claims, with equivalents of the claims to be included therein.

That which is claimed is:

1. A process for making a fluorinated copolymer having a stable end group, said process comprising contacting fluoroolefin, a comonomer capable of copolymerizing with said fluoroolefin, an initiator capable of producing said stable end groups on said polymer, and a polymerization medium comprising liquid or supercritical carbon dioxide; and copolymerizing said fluoroolefin and said comonomer.

2. The process according to claim 1, wherein said fluoroolefin is tetrafluoroethylene.

3. The process according to claim 1, wherein said comonomer is a fluorinated comonomer.

4. The process according to claim 1, wherein said comonomer contains functionality selected from the group consisting of $SO_2F$ and $CF_2=CFO$.

5. The process according to claim 1, wherein said comonomer contains at least one functional group selected from the group consisting of $CF_2=CFOCF_2CF(CF_3)OCF_2CF_2SO_2F$; $CF_2=CFOCF_2CF_2SO_2F$; and $CF_2=CFOCF_2CF(CF_3)OCF_2CF_2CO_2CH_3$.

6. The process according to claim 1, wherein said polymerization medium comprises liquid carbon dioxide.

7. The process according to claim 1, wherein said polymerization medium comprises supercritical carbon dioxide.

8. The process according to claim 1, wherein said initiator is selected from the group consisting of chlorinated acyl peroxides, fluorinated acyl peroxides, perfluorinated azo compounds, $R_4N=NR_4$ wherein $R_4$ is a linear or branched $C_1$–$C_8$ perfluorocarbon, and perfluoralkane radicals.

9. The process according to claim 1, further comprising a chain transfer agent.

* * * * *